United States Patent
Bhatia et al.

(10) Patent No.: US 12,056,434 B2
(45) Date of Patent: Aug. 6, 2024

(54) GENERATING TAGGED CONTENT FROM TEXT OF AN ELECTRONIC DOCUMENT

(71) Applicant: Oracle International Corporation, Redwood Shores, CA (US)

(72) Inventors: Vishank Bhatia, Sunnyvale, CA (US); Xu Zhong, Vermont South (AU); Thanh Long Duong, Point Cook (AU); Mark Johnson, Castle Cove (AU); Srinivasa Phani Kumar Gadde, Fremont, CA (US); Vishal Vishnoi, Redwood City, CA (US); King-Hwa Lee, Bellevue, WA (US); Christopher Kennewick, Kirkland, WA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/150,924

(22) Filed: Jan. 6, 2023

(65) Prior Publication Data

US 2024/0061992 A1    Feb. 22, 2024

Related U.S. Application Data

(60) Provisional application No. 63/400,005, filed on Aug. 22, 2022.

(51) Int. Cl.
*G06F 40/117* (2020.01)
*G06F 16/9538* (2019.01)
(Continued)

(52) U.S. Cl.
CPC ........ *G06F 40/117* (2020.01); *G06F 16/9538* (2019.01); *G06F 16/9558* (2019.01);
(Continued)

(58) Field of Classification Search
CPC .... G06F 40/117; G06F 40/134; G06F 40/143; G06F 40/205; G06F 16/9538; G06F 16/9558; G06T 2207/30176
See application file for complete search history.

(56) References Cited

U.S. PATENT DOCUMENTS

| 6,697,801 B1 * | 2/2004 | Eldredge | ............... | G06F 16/313 |
| | | | | 707/E17.084 |
| 2011/0258535 A1 * | 10/2011 | Adler, III | .............. | G06F 40/151 |
| | | | | 715/235 |

(Continued)

OTHER PUBLICATIONS

Masahiro et al., "Sequence information extraction apparatus, sequence information extraction method and sequence information extraction program", published on Apr. 27, 2006, Document ID: JP-2006113786-A, pp. 20 (Year: 2006).*

(Continued)

*Primary Examiner* — Chau T Nguyen
(74) *Attorney, Agent, or Firm* — Invoke

(57) ABSTRACT

Techniques for generating formatting tags for textual content obtained from a source electronic document are disclosed. A system parses a digital file to obtain information about characters in an electronic document. The system applies tags to text generated based on the textual content of the electronic document by creating segments of textually-consecutive characters and applying corresponding text formatting style tags to the segments. The system further identifies segments of text overlapping bounding boxes in the electronic document. The system generates textual content including a segment of text and a corresponding hyperlink associated with the segment of text. The system further generates textual content by selectively applying line breaks from the source electronic document in the textual content.

40 Claims, 6 Drawing Sheets

(51) Int. Cl.
  *G06F 16/955* (2019.01)
  *G06F 40/134* (2020.01)
  *G06F 40/143* (2020.01)
  *G06F 40/205* (2020.01)
  *G06T 7/70* (2017.01)
(52) U.S. Cl.
  CPC .......... *G06F 40/134* (2020.01); *G06F 40/143* (2020.01); *G06F 40/205* (2020.01); *G06T 7/70* (2017.01); *G06T 2207/30176* (2013.01)

(56) References Cited

U.S. PATENT DOCUMENTS

| | | | |
|---|---|---|---|
| 2019/0205362 A1* | 7/2019 | Prebble | G06F 40/137 |
| 2019/0297390 A1* | 9/2019 | Grusd | H04N 21/47202 |
| 2023/0039280 A1* | 2/2023 | Juhl | G06F 40/177 |

OTHER PUBLICATIONS

Voicu et al., "System and method for moving target selection of robot flow automation", published on Feb. 18, 2022, Document ID: CN-113015956-B, pp. 18 (Year: 2022).*

* cited by examiner

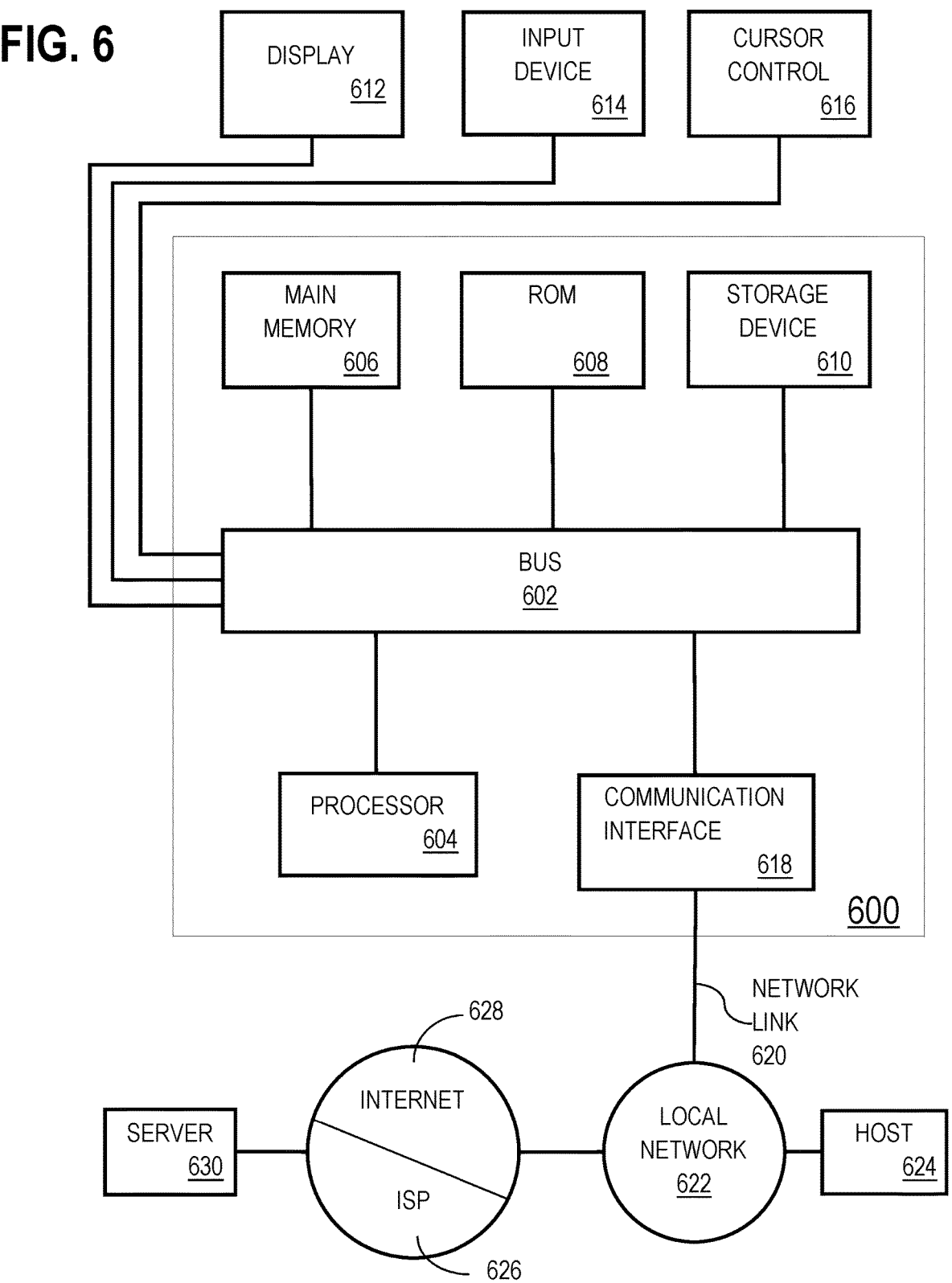

GENERATING TAGGED CONTENT FROM TEXT OF AN ELECTRONIC DOCUMENT

INCORPORATION BY REFERENCE; DISCLAIMER

The following application is hereby incorporated by reference: application No. 63/400,005 filed on Aug. 22, 2022. The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to generating tagged content from the text of an electronic document. In particular, the present disclosure relates to creating tagged content corresponding to rich text style formatting, hyperlinks, and line breaks in a source electronic document.

BACKGROUND

Electronic documents, such as portable document format (PDF) documents include text formatting, such as style formatting. A data file storing binary data representing the electronic document stores characters and metadata associated with the characters. For example, a character "a" that appears with a "bold" formatting style in the document may be stored in the data file as [character: a], [style: bold]. However, when another application reproduces content from the electronic document in another data format, such as html, the destination data format may have different rules for applying formatting styles to text. As a result, an application that presents data in the destination data format may be unable to reproduce the text formatting styles from the electronic document in the destination data format. The inability to reproduce text formatting styles may result in reduced clarity and emphasis, in creating a different semantic meaning of text or content, or providing reduced functionality, such as making linking to additional documents difficult or impossible.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 6 shows a block diagram that illustrates a computer system in accordance with one or more embodiments.

DETAILED DESCRIPTION

Figure 1:
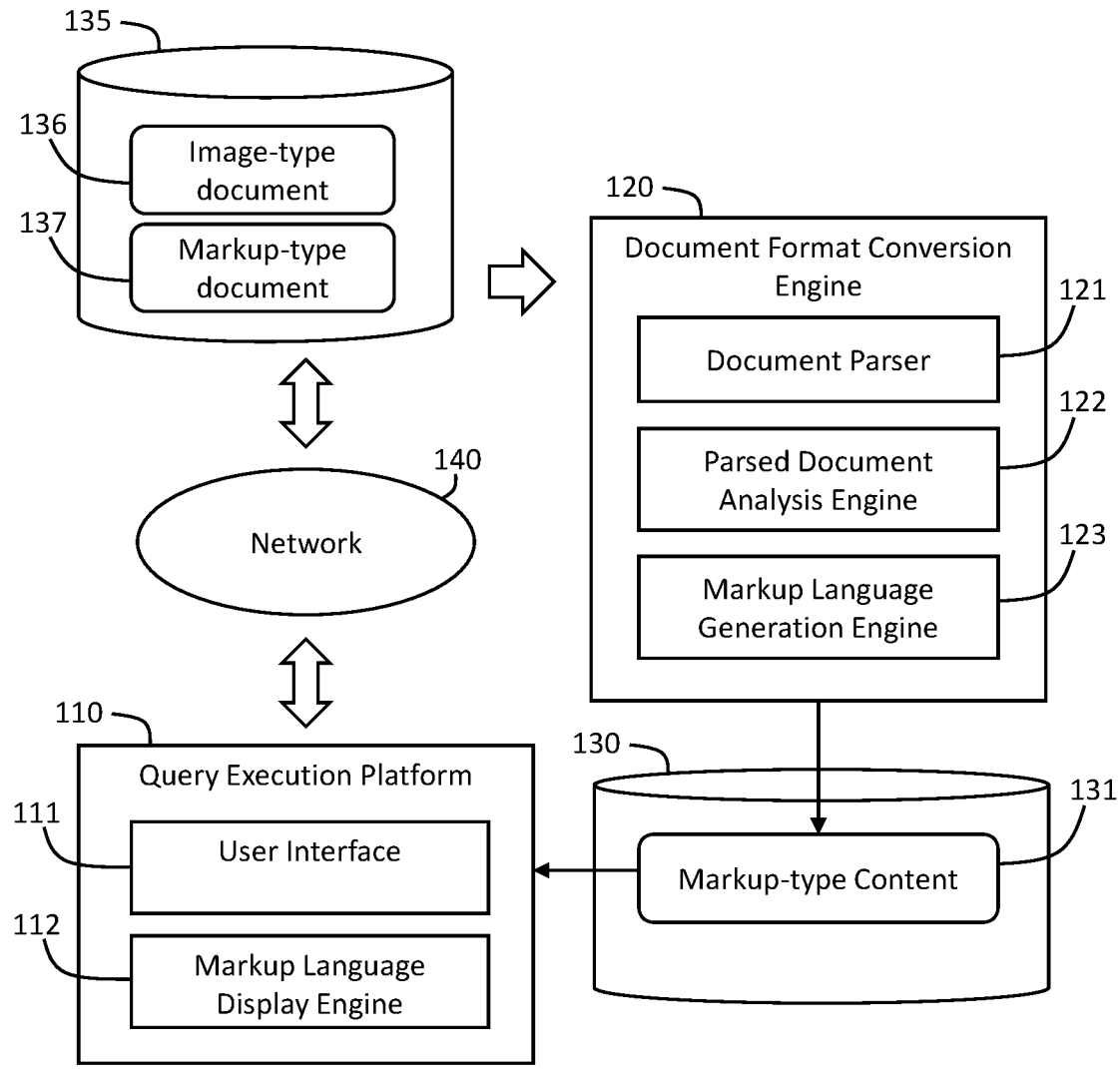
FIG. 1 illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. GENERATING TAGGED CONTENT REPRESENTING TEXT ASSOCIATED WITH A HYPERLINK FROM A SOURCE ELECTRONIC DOCUMENT
4. GENERATIG TAGGED CONTENT REPRESENTING TEXT FORMATTING STYLES FROM A SOURCE ELECTRONIC DOCUMENT
5. GENERATING TAGGED CONTENT REPRESENTING LINE BREAKS ASSOCIATED WITH TEXT SEGMENTS FROM A SOURCE ELECTRONIC DOCUMENT
6. EXAMPLE EMBODIMENT
7. COMPUTER NETWORKS AND CLOUD NETWORKS
8. MISCELLANEOUS; EXTENSIONS
9. HARDWARE OVERVIEW

1. General Overview

An application, such as a chatbot or a digital assistant, may respond to queries by accessing data from different electronic documents. The electronic documents may be formatted in a particular manner based on the layout of the document and based on the textual content in the document. For example, a list of items may be formatted with bold-style rich text formatting on a first line, line breaks after each item on the list, and a hyperlink to another document. A system may selectively reproduce formatting from the source electronic document in a different document format when generating a response to a query. The system may present the tagged/formatted content, for example, within an excerpt of a search result presented by a search engine, a chatbot, or a digital assistant.

One or more embodiments include generating textual content by applying text formatting style tags to segments of characters obtained from a source electronic document. A system parses the source electronic document to identify characters and metadata associated with the characters. The metadata includes text formatting styles of the characters. A digital file may store metadata for each particular character describing the text formatting style for that particular character. The system generates segments of characters with the same text formatting style. The segments may be made up of strings of characters which are textually-consecutive and which have the same text formatting style. A single segment of textually consecutive characters, as referred to herein, may include characters across different words with empty spaces between the words. Accordingly, consecutive characters in a single segment, as referred to herein, may or may not be contiguous. In an example, a phrase "further information required" in a source electronic document may be depicted in a bold style. In addition, the word "required" may be underlined. The system may generate a first segment including the characters "f, u, r, t, h, e, r, i, n, f, o, r, m, a, t, i, o, n, r, e, q, u, i, r, e, d" with a text formatting tag(s) to format the first segment using a bold style. The system may further generate a second segment including the characters "r, e, q, u, i, r, e, d" with a text formatting tag(s) to format the second segment in an underline style. In one or more embodiments, the text formatting style tag is associated with a different file format than the source electronic document. For example, the source electronic document may be a PDF document and the system-generated text formatting style tag may be an html-type tag. The system may display the text from the source document in an html-based web page using the same formatting style as the text in the source electronic document.

One or more embodiments include generating textual content by applying hyperlink-type tags to segments of characters from a source electronic document. The system parses the source electronic document to identify characters and metadata associated with the characters. The metadata includes location information, such as coordinates, of the characters. The system further identifies bounding box boundaries of a hyperlink bounding box within the electronic document. The system identifies a segment of text overlapping a region defined by the boundaries of the bounding box. For example, the system may compare coordinates of text characters to a region defined by the coordinates and/or the boundaries of the bounding box. The system applies a hyperlink-type tag to the segment of text overlapping the region defined by the coordinates and/or boundaries of the bounding box. For example, the system may determine that the coordinates of a string of characters "S, u, b, m, i, t" overlaps a region of a particular bounding box in the electronic document. The system may generate a segment including the word "Submit" and may link the segment to a hyperlink tag. The system may display the text from the source document in an html-based web page while linking the same text as in the source electronic document (e.g., "Submit") to the same hyperlink address as in the source electronic document.

One or more embodiments include generating textual content by applying line break tags to text obtained from a source electronic document. The system parses the source electronic document to identify characters and metadata associated with the characters. The system further identifies line breaks within a digital file corresponding to the parsed electronic document. The system determines whether the line breaks correspond to return-type breaks in the text of the source electronic document. For example, the system determines whether the line breaks correspond to paragraph transitions or separating items in a list. The system generates textual content including line break tags corresponding to return-type line breaks in the source electronic document. The system refrains from generating line break tags for line breaks in the digital file that do not correspond to return-type line breaks in the source electronic document. The system may display the text from the source electronic document in an html-based web page while including the return-type line breaks and omitting the non-return type line breaks. For example, if a user expands the size of a window displaying html text content, the browser may increase the length of lines of text to increase the number of characters that fit on the lines of text. By refraining from including line breaks that may appear in a source document at the end of a line, which give the line a static length, the system may change the length of text lines to accommodate a size of a web page displaying html text.

One or more embodiments described in this Specification and/or recited in the claims may not be included in this General Overview section.

2. System Architecture

FIG. 1 illustrates a system 100 in accordance with one or more embodiments. The system 100 generates tagged content based on text formatting metadata of a source electronic document. As illustrated in FIG. 1, system 100 includes a query execution platform 110, a document format conversion engine 120, a data repository 130, and a network 140. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

A query execution platform 110 receives queries including query terms. For example, a user may generate a query via a user interface 111. According to an example embodiment, the query execution platform 110 is executed on a chatbot or digital assistant. The chatbot or digital assistant may run on an electronic device, such as a personal computer, mobile device, or audio device. The user interface 111 may receive typed query terms in a query field. Additionally, or alternatively, the query execution platform 110 may detect user-generated content and recommend query terms based on user-generated content. In addition, or in the alternative, the query execution platform 110 may detect vocalized query terms and convert the vocalized query terms into digital content. Based on detecting query terms, the query execution platform 110 searches one or more content sources 135 for content matching the query terms. The query execution platform 110 may communicate with the content source(s) 135 via a network 140. The network 140 may include a local area network (LAN), cloud-based network, and wide-area network (WAN), such as the Internet. For example, the content sources 135 may include servers connected to the Internet, accessible via web addresses, with content searchable via a search engine. Alternatively, the content sources 135 may be servers maintained by an organization, accessible to devices authorized by the organization, and inaccessible via the Internet.

Based on identifying content matching query terms, the query execution platform 110 renders markup-type content on the user interface 111 using a markup language display engine 112. For example, the markup language display engine 112 may generate visual content in a web browser to display the markup language content. If the query execution platform 110 determines that content is not in a markup-type format, the query execution platform 110 provides the content to a document format conversion engine 120. For example, content may be contained in an image-type document 136. An image-type document 136 may include a portable data format (PDF) type document or an XML Paper Specification (XPS) type document. The image-type document 136 is stored as a digital file including: (a) for each character in the document, a description of attributes of the character, such as font, style, and location, and (b) for each object in the document, a description of attributes of the object, including shape, color, size, and location. Location information includes, for example, coordinates of the character or object, such as a number of pixels from an edge of the document.

A document parser 121 parses a digital file representing the image-type electronic document 136 to identify attributes associated with characters in the document and attributes associated with objects in the document. The document parser 121 generates parsed content, such as a parsed file, including the attribute data for characters and objects in the document. For each character, the document parser 121 generates attribute data describing: (a) a location of a character/object, (b) font data associated with each character, and (c) font style data associated with each character.

A parsed document analysis engine 122 analyzes the parsed document generated by the document parser 121 to identify convertible content. For example, the parsed document analysis engine 122 may identify a bounding box associated with a hyperlink in the image-type document 136. The bounding box is convertible into a markup-type format by identifying the characters in the document overlapping the bounding box. As another example, the parsed document analysis engine 122 may identify font styles of characters in the image-type document 136. The font styles are convertible into a markup-type format by grouping characters into segments which share a same font style. According to yet another example, the parsed document analysis engine 122 may identify line breaks in the image-type document 136. The line-breaks are convertible into a markup-type format by differentiating between characters at the end of a paragraph or list item and characters in the middle of a word or sentence that continues onto a next line.

A markup language generation engine 123 generates markup-type content 131 from the parsed document corresponding to the image-type document 136. The markup language generation engine 123 applies markup-type tags to text content based on the analysis of the parsed document analysis engine 122 to generate the markup-type content 131.

For example, based on the parsed document analysis engine 122 determination of a set of characters overlapping a hyperlink bounding box in the image-type document 136, the markup language generation engine 123 generates a text segment corresponding to the set of characters and a set of hyperlink tags associated with the text segment. Based on the parsed document analysis engine 122 determination of a set of sequential characters characterized by the same font style, the markup language generation engine 123 generates a text segment corresponding to the set of sequential characters and a set of format tags associated with the set of sequential characters. Based on the parsed document analysis engine 122 determination of character locations corresponding to a line break it the text, the markup language generation engine 123 generates text content corresponding characters on each side of the line break and line break tags associated with the characters.

The markup language display engine 112 displays the markup-type content 131. For example, the markup language display engine 112 may render the markup-type content 131 in a browser window of a graphical user interface (GUI) of the user interface 111.

According to one embodiment, the query execution platform 110 identifies content matching query terms in a markup-type document 137 in the content sources 135. Based on determining that the content is markup-type content, the query execution platform 110 may render the content in a display without processing the content by the document format conversion engine 120. According to one or more embodiments, the query execution platform 110 includes the functionality to display markup-type content 131 matching query terms and excludes or lacks functionality to display image-type content in its original format. For example, the query execution platform 110 may lack functionality to display, as query results, the image-type document including a hypertext link. The query execution platform 110 may lack functionality to display, as query results, text in the image-type document with font styles displayed. The query execution platform 110 may lack functionality to display, as query results, line breaks at locations corresponding to line breaks in the image-type document. For example, in an embodiment in which the query execution platform 110 is a digital assistant running on a personal computer, the query execution platform 110 may lack functionality to display image-type content in its original format as query results, while other applications, such as Internet browsers, may include functionality to display image-type documents 136.

Additional embodiments and/or examples relating to computer networks are described below in Section 7, titled "Computer Networks and Cloud Networks."

In one or more embodiments, a data repository 130 is any type of storage unit and/or device (e.g., a file system, database, collection of tables, or any other storage mechanism) for storing data. Further, a data repository 130 may include multiple different storage units and/or devices. The multiple different storage units and/or devices may or may not be of the same type or located at the same physical site. Further, a data repository 130 may be implemented or may execute on the same computing system as the query execution platform 110 and the document format conversion engine 120. Alternatively, or additionally, a data repository 130 may be implemented or executed on a computing system separate from the query execution platform 110 and the document format conversion engine 120. A data repository 130 may be communicatively coupled to the query execution platform 110 and the document format conversion engine 120 via a direct connection or via a network.

Information describing markup-type content 131 may be implemented across any of components within the system 100. However, this information is illustrated within the data repository 130 for purposes of clarity and explanation.

In one or more embodiments, a query execution platform 110 and/or a document format conversion engine 120 refer to hardware and/or software configured to perform operations described herein for executing queries and converting document formats in response to identifying content matching query terms. Examples of operations for performing document format conversion from image-type content to markup-type content are described below with reference to FIGS. 2-4.

In an embodiment, the query execution platform 110 and the document format conversion engine 120 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

In one or more embodiments, interface 111 refers to hardware and/or software configured to facilitate communications between a user and the query execution platform 110. Interface 111 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of interface 111 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, interface 111 is specified in one or more other languages, such as Java, C, or C++.

Figure 2:
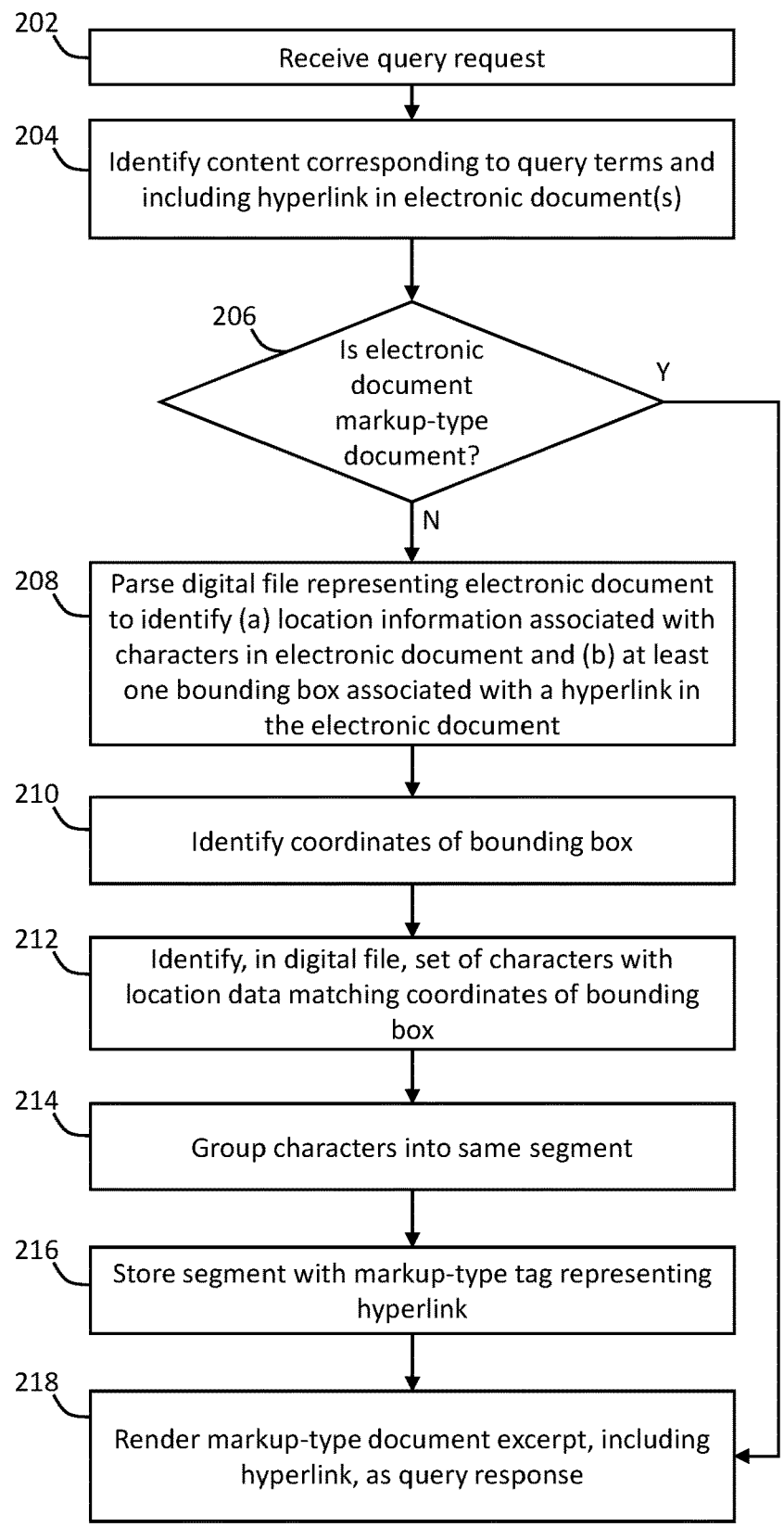
FIG. 2 illustrates an example set of operations for generating tagged content representing text formatting styles from a source electronic document in accordance with one or more embodiments.

3. Generating Tagged Content Representing Text Associated with a Hyperlink from a Source Electronic Document FIG. 2 illustrates an example set of operations for generating tagged content representing text associated with a hyperlink in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

A system receives a query request (Operation 202). The query request includes query terms to be sought in a set of documents. The set of documents may include a particular set of documents maintained by an organization. Alternatively, the set of documents may include documents accessible to a query platform via a wide area network (WAN) such as the Internet. The system may receive the query request via a chatbot or digital assistant. The system may receive the query request via a user interface, such as via a text interface or a voice interface. The system may automatically, without user intervention, generate the query request in response to identifying a user operation or user typing in another other than a query-generation application.

The system identifies content corresponding to query terms in an electronic document (Operation 204). In the embodiment illustrated in FIG. 2, the electronic document includes at least one bounding box associated with a hyperlink. The hyperlink includes address information, such that when the hyperlink is selected by a user, the system directs an application to another location or file.

The system determines whether the electronic document is a markup-type document (Operation 206). For example, the system may determine whether the electronic document is a hypertext markup language (HTML) document. A markup-type document refers to a document containing content satisfying a particular text-encoding system in which predefined symbols are inserted in the content to define how text is structured and formatted in the document.

If the system determines the electronic document is a markup-type document, the system renders the markup-type document (Operation 218) without performing operations for converting the document into another format.

If the system determines the electronic document is not a markup-type document, the system parses a digital file representing the electronic document to identify location information associated with characters in the document and location information associated with a bounding box associated with a hyperlink in the electronic document (Operation 208). For example, the electronic document may be an image-type document, such as a PDF document or an XPS document. An image-type document parser represents character locations as sets of coordinates. The image-type document parser also represents bounding box boundaries as sets of coordinates. According to one embodiment, the digital file is a binary-encoded data file. According to one embodiment, the electronic document is an image-type document. The electronic document stores metadata specifying each character in the electronic document, location information associated with each character, and location information associated with bounding boxes in the electronic document.

The system analyzes the metadata to determine coordinates of the hyperlink bounding box within the electronic document (Operation 206). For example, the system identifies a bounding box as defined by the coordinates: 332.471, 606.784, 334.780, 618.804, 458.164, 626.764, 478.557, 630.534.

The system analyzes the metadata to determine location information associated with a set of characters matching coordinates of the bounding box (Operation 212). The system may identify characters that overlap a region defined by the boundaries of the bounding box. For example, the system may determine that the bounding box has one edge at one end of a word and another edge at an opposite end of the word. In the example above in which the system identifies the hyperlink bounding box as having boundaries defined by the coordinates 332.471, 606.784, 334.780, 618.804, 458.164, 626.764, 478.557, 630.534, the system may identify a character location within an electronic document as: 334.780, 618.804, 340.557, 628.764. The system determines that the character intersects at least a portion of the area specified by the hyperlink bounding box coordinates.

The system groups a set of characters corresponding to the boundaries of the hyperlink bounding box into a segment (Operation 214). For example, the system may identify a set of characters: "P-a-y-m-e-n-t-A-p-p-r-o-v-e" as intersecting the region within the hyperlink bounding box. The system stores the set of characters in a same segment. In one or more embodiments, the system groups a subset of characters intersecting, or located within, a bounding box while excluding at least some characters intersecting the bounding box. For example, based on character metadata, the system identifies a first set of characters located entirely within a bounding box. The system identifies a second set of characters positioned above the first set of characters and intersecting the bounding box. The system excludes the second set of characters from the segment of characters associated with the bounding box.

According to another example, the system identifies a first set of characters intersected by a bounding box. The first set of characters has a lower boundary defined by a lowest point of at least one character and an upper boundary defined by an upper point of at least one character. The system groups the characters into a same segment associated with a hyperlink based on determining that an edge of the bounding box intersects the characters over halfway between the lower boundary and the upper boundary, such that over half of the region between the lower boundary and the upper boundary is located within the bounding box. The system identifies a second set of characters intersected by a bounding box. The second set of characters has a lower boundary and an upper boundary defined by an upper point of at least one character. The system refrains from grouping the characters into the same segment associated with the hyperlink based on determining that an edge of the bounding box intersects the characters less than halfway between the lower boundary and the upper boundary.

According to another example, the system identifies a first set of characters belonging to a same token in the electronic document that is intersected by a bounding box. A token is a set of one or more characters that are on the same row and within a predetermined distance of one another. For example, each word in a row is a separate token. In addition, a number (e.g., "30) is a separate token. Punctuation is a separate token from adjacent alphanumerical tokens. The system may identify tokens within the document using a tokenizer. The tokenizer may be part of the document parser or separate from the document parser. Based on determining that the bounding box intersects the token, the system groups each character in the token into the same segment associated with a hyperlink.

The system stores the segment together with a markup-type tag representing the hyperlink (Operation 216) associated with the hyperlink bounding box. Storing the formatting tag representing the hyperlink together with the segment results in each character in the segment being associated with the hyperlink in text generated based on the character segment information. In the example above in which the system generates a segment of characters: "P-a-y-m-e-n-t-A-p-p-r-o-v-e", the system may store the following, based on hyperlink data identified in the electronic document associated with the bounding box: "<a href=mailto: PaymentApprove@xxxy.com?subject=KYC % Document %20Submission>Payment Approve</a>". The system stores the segment and markup-type tag in a markup-type document including the content matching the query terms. For example, the system may identify a paragraph within a document including content matching the query terms. According to one example, the system generates markup tags associated with the relevant paragraph and stores the relevant paragraph without storing the rest of the document. According to another example, the system converts the entire document into a markup-type format.

The system renders an excerpt of the electronic document in a markup-type document format, including the hyperlink, as a query response (Operation 218). The system may generate a web browser tab or window to display content. According to one example, the system generates query responses by rendering HTML content in a display window of a graphical user interface.

According to the above-described embodiments, the system converts text from one document format type to another. For example, the system may obtain text data from a digital file representing a PDF-type document and duplicate the hyperlink positions from the PDF type document in a web-based HTML format. The system may display the resulting text, including a hyperlink, in a web page.

Figure 3:
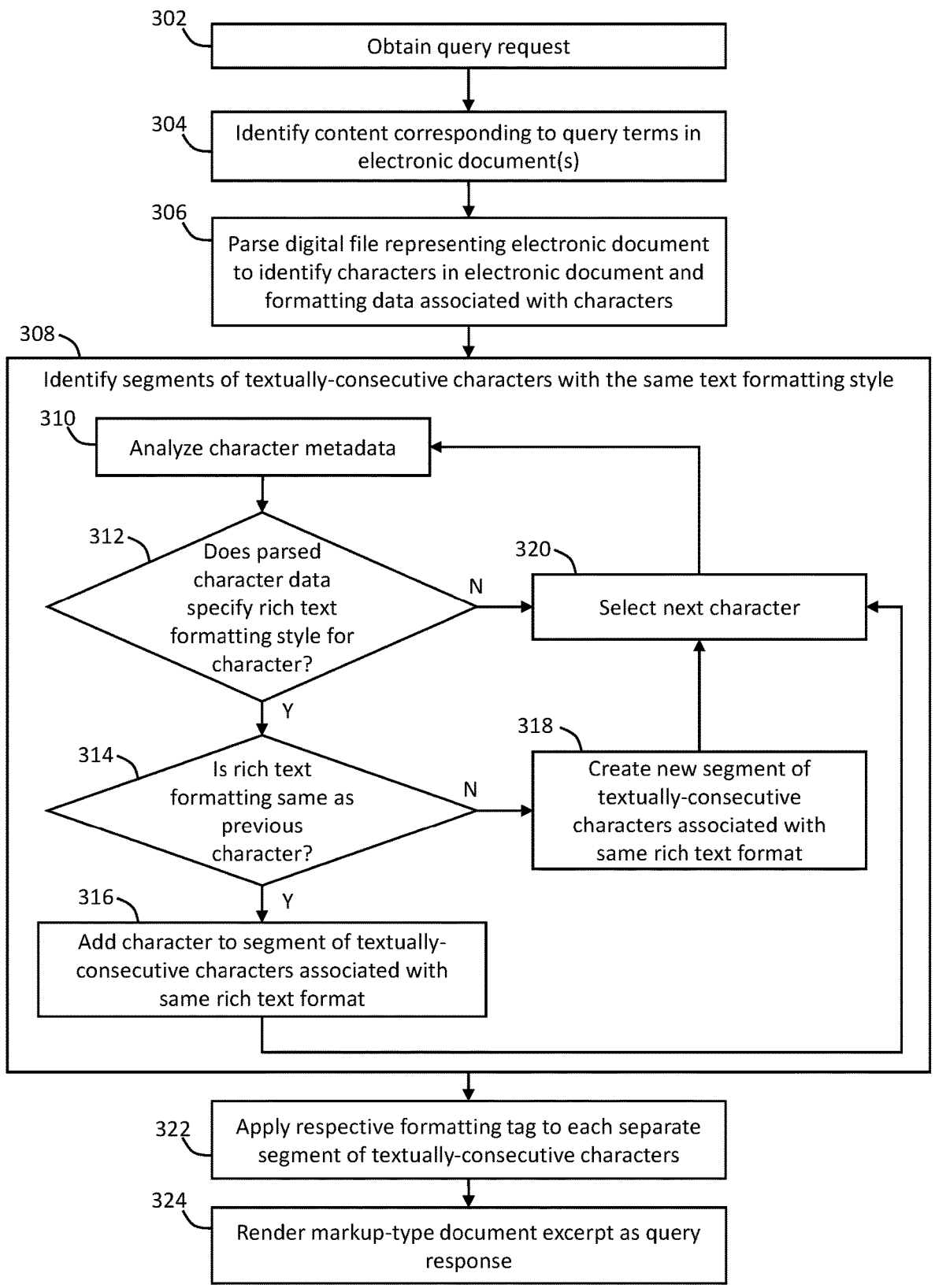
FIG. 3 illustrates an example set of operations for generating tagged content representing text associated with a hyperlink from a source electronic document in accordance with one or more embodiments.

4. Generating Tagged Content Representing Text Formatting Styles from a Source Electronic Document FIG. 3 illustrates an example set of operations for generating tagged content representing text formatting styles of text obtained from a source electronic document in accordance with one or more embodiments. One or more operations illustrated in FIG. 3 may be modified, rearranged, or omitted all together. Accordingly, the particular sequence of operations illustrated in FIG. 3 should not be construed as limiting the scope of one or more embodiments.

A system receives a query request (Operation 302). The query request includes query terms to be sought in a set of documents. The set of documents may include a particular set of documents maintained by an organization. Alternatively, the set of documents may include documents accessible to a query platform via a wide area network (WAN) such as the Internet.

The system identifies content corresponding to query terms in an electronic document (Operation 304). In the embodiment illustrated in FIG. 3, the electronic document includes text style formatting, such as bold, italic, underscore, and strikethrough.

The electronic document may be stored as a digital file, such as a binary-encoded file. The electronic document includes metadata specifying each character in the electronic document and a formatting style associated with characters. For example, the electronic document may include a sequence of characters "U-R-G-E-N-T." The document may include metadata associated with each letter indicating that each letter is displayed in a bold-type font style. In one or more embodiments, the electronic document is a portable document format (PDF) type document.

The system parses the digital file corresponding to the source electronic document to identify the characters in the document and the formatting data associated with the characters (Operation 306). For example, in an electronic document which, when displayed in a document viewer, includes the words "URGENT" in bold style and "read" in non-bold style, the system may apply a document-parsing program to a digital file representing the electronic document. The document-parsing program may return data including: "[character:U][location:25,45][dimensions:8,16][font:Calibri][formatting:Bold];[character:R][loc ation:25:54][dimensions:8,16][font:Calibri][formatting:Bold] . . . [character:r][location:41:12][dimensions:8,8][font:Calibri];[character:e][location:41:21][dimensions:8,8][font: Calibri];[character: a][location:41:30][dimensions:8,8][font: Calibri] . . . "

In other words, the document-parsing program returns data identifying each character, and information describing how to display the character in the electronic document. The information may include location information, such as coordinate information, size information, font, and style formatting for each character separately.

The system identifies segments of textually-consecutive characters with the same rich text formatting (Operation 308), which allows the system to identify, in a generated document, rich text formatting for groups of characters rather than for individual characters. For example, the system may identify multi-digit numbers, words, sentences, lines, and paragraphs in which the characters are formatted with the same rich text formatting style. Examples of rich text formatting styles include bold, italic, underlined, and strike-through. In one or more embodiments, textually-consecutive characters include characters that are adjacent to each other in a reading order of the text. This includes characters that are adjacent to each other within a same word, characters that are adjacent to each other in adjacent words, characters that are adjacent to each other in adjacent sentences, and characters that are adjacent to each other in adjacent numbers. Textually adjacent characters may be separated from each other in a visual formatting of a document. For example, one word of a sentence may be located at the end of one line of text. The next word in the sentence may be located at the beginning of the next line of text. Similarly, a single word that is split between two lines of text may be separated by a hyphen. The hyphen at the end of one line of text is textually-consecutive with the letter that begins the next line of text. In a document divided into multiple columns, a character at the end of one column may not be textually adjacent to a character at the beginning of an adjacent column on the same row. Instead, a textually-adjacent character in a multi-column document corresponds to the next character in the reading order of the text. The character at the end of a line in one column is textually adjacent to the character that begins the next line of the same column. Alternatively, the character at the end of the last line of the column may be textually adjacent to the character that begins the first line of the next column.

The system selects a character from the parsed digital file and analyzes character metadata (Operation 310). The system may sequentially analyze each character described in the binary data file representing the electronic document. Characters include letters, numbers, and symbols.

The system determines whether the parsed character data specifies a particular style-type formatting for the character (Operation 312). For example, the system may determine that the character data associated with a character "U" specifies the "U" is displayed with a bold-type formatting style. If the system determines that no formatting style is specified for a character, the system may determine that the character is displayed in the electronic document without any formatting style. According to one embodiment, the system determines whether the characters are displayed with a rich text formatting (RTF) style in the electronic document.

The system determines if the text formatting style of the selected character is the same as the previous character (Operation 314). The system compares the text formatting style metadata of the currently-selected character with the text formatting style metadata of the previously-selected character. For example, the system may compare the text formatting style of a selected character within a word in the electronic document to the text formatting style of the previous character in the word. The system may compare the text formatting style of a selected character at the beginning of a word to the text formatting style of a character at the end of an adjacent word.

Based on determining that the style formatting of the selected character is the same as that of the previous character, the system adds the character to the segment of textually consecutive characters associated with the same style formatting (Operation 316). Each segment of textually consecutive characters includes a set of one or more textually-adjacent characters. For example, a phrase in an electronic document may read "do not open." The word "not" may have an italic-type text formatting. In this case, the system generates a segment including the textually-consecutive characters "n," "o," and "t."

If the system determines that the style formatting of the selected character is different from that of the previous character, the system creates a new segment of textually consecutive characters and adds the character to the new segment (Operation 318). For example, a phrase in an electronic document may read "neither a nor b." The entire phrase may have a bold-type formatting. The characters "a" and "b" may also include an italic-type formatting. In this case, the system generates a segment to include the textually-consecutive characters "n-e-i-t-h-e-r-a-n-o-r-b." Based on determining the character "a" has a different formatting style (e.g., it also includes an italic formatting style), the system generates a new segment to include the character "a." The system next detects the character "n" has a different formatting style from the character "a." Accordingly, the system stores the character "a" as a single-letter segment. The system detects the character "b" has a different formatting style from the character "r" in the word "nor." Accordingly, the system creates a new segment for the character "b." Since the characters "a" and "b" are non-consecutive, the system stores the characters as separate segments, even though the characters have the same formatting styles.

The system selects the next character in the digital file for analysis (Operation 320) and repeats the process of analyzing characters and generating segments until a terminal event is reached, such as analysis of the entire electronic document, a page of the electronic document, or a specified set of text within the electronic document. The system may repeat the process of generating segments for sets of consecutive characters of the same rich text style formatting until segments are created for each set of consecutive characters of the same text formatting style.

The system applies a respective text formatting style tag to each segment of textually consecutive characters (Operation 322). In the example above in which the system generates four segments corresponding to textually-consecutive characters, "neither," "a," "nor," "b," the system applies a tag to each of the segments, such as: <strong>neither <em>a</em>nor <em>b</em>.</strong>. By identifying the longest contiguous occurrence for a given formatting style rather than looking for the exact same formatting style, the system eliminates the redundant tags.

The system renders an excerpt of the electronic document in a markup-type document format, including the text formatting corresponding to formatting in the source document, as a query response (Operation 324). The system may generate a web browser tab or window to display content. According to one example, the system generates query responses by rendering HTML content in a display window of a graphical user interface.

In the above-described embodiment, the system converts text from one document format type to another. For example, the system may obtain text data from a digital file representing a PDF-type document and duplicate the rich text format from the PDF type document in a web-based HTML format. The system may display the resulting text in a web page. As another example, the system may parse an image to generate a digital file specifying each character in the image and a text formatting style associated with each character in the image. The system performs the above operations to convert the text obtained from the image into another format, such as HTML format.

Figure 4:
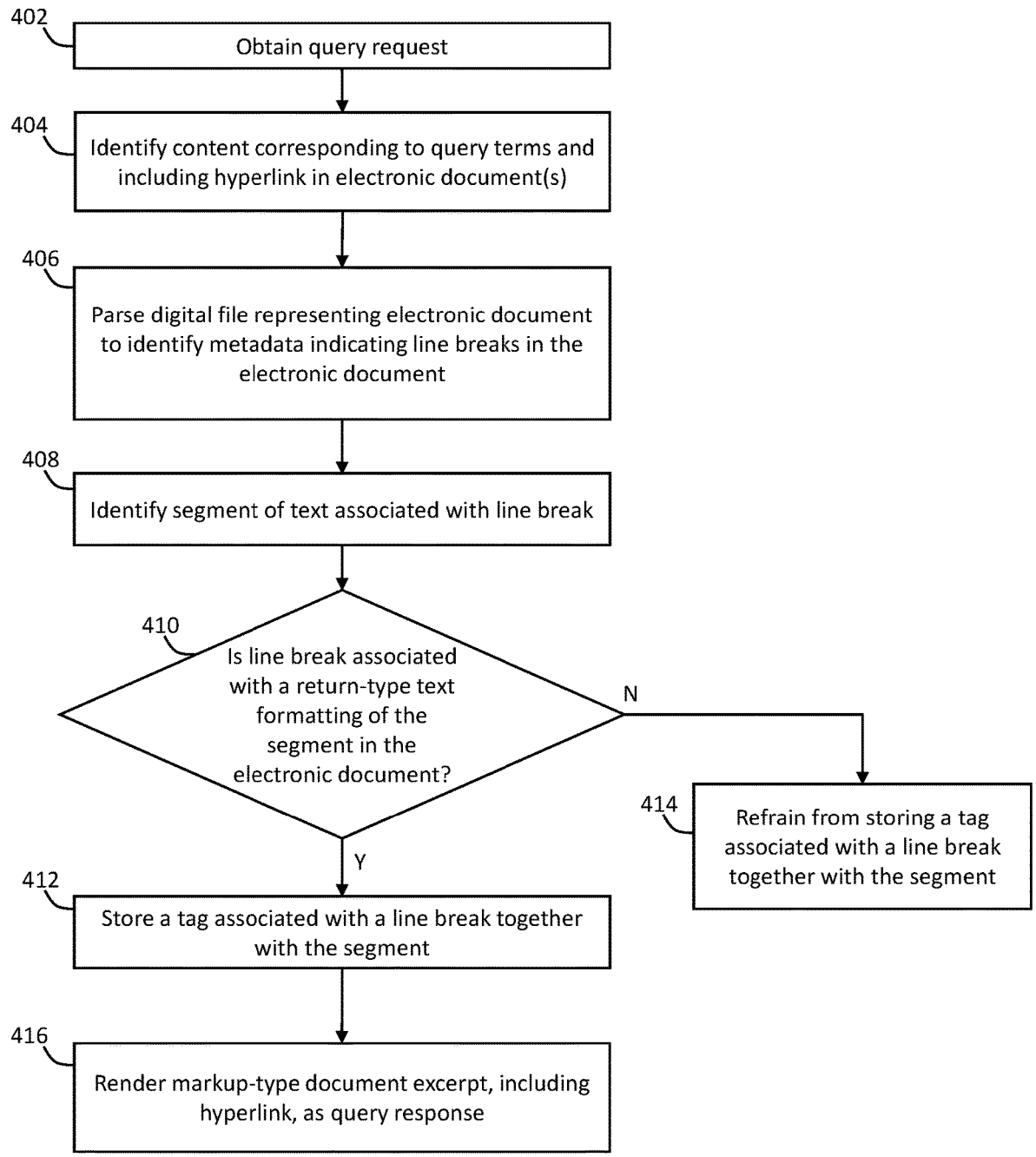
FIG. 4 illustrates an example set of operations for generating tagged content representing text associated with line breaks from a source electronic document in accordance with one or more embodiments.

5. Generating Tagged Content Representing Line Breaks Associated with Text Segments from a Source Electronic Document FIG. 4 illustrates an example set of operations for generating tagged content representing line breaks associated with text segments from a source electronic document in accordance with one or more embodiments. One or more operations illustrated in FIG. 4 may be modified, rearranged, or omitted all together. Accordingly, the particular sequence of operations illustrated in FIG. 4 should not be construed as limiting the scope of one or more embodiments.

A system receives a query request (Operation 402). The query request includes query terms to be sought in a set of documents. The set of documents may include a particular set of documents maintained by an organization. Alternatively, the set of documents may include documents accessible to a query platform via a wide area network (WAN) such as the Internet.

The system identifies content corresponding to query terms in an electronic document (Operation 404). In the embodiment illustrated in FIG. 4, the electronic document includes line breaks. The electronic document stores metadata specifying each character in the electronic document, location information associated with each character, and location information associated with line breaks in the electronic document.

The system parses a digital file representing the electronic document to identify location information associated with characters in the electronic document and metadata indicating line breaks in the electronic document (Operation 406). For example, a document may include the words: " . . . documents are required." followed by a line break, which is then followed by a new sentence, "The documentation matrix . . . " The digital file may include the following data:

character: "d", [character coordinates], character: ".", [character coordinates]
[line break]
[line break]
character: "T", [character coordinates], character: "h", [character coordinates], . . .

The system identifies a segment of text associated with the line break in the electronic document (Operation 408). The segment of text includes text preceding the line break and text following the line break. In the example above, the segment of text includes "required." and "The documentation . . . "

The system determines whether the line break in the digital file corresponding to the electronic document is associated with a return-type text formatting of the segment in the electronic document (Operation 410). For example, the electronic document may include metadata representing a line break at the end of every line of the electronic document. If a sentence continues from one line to the next, the electronic document may include metadata representing a line break in the middle of the sentence. If an electronic document includes columns and other formatting features that result in lines of text that extend across only portions of the electronic document, the electronic document may include metadata representing line breaks at the end of each line in the column. According to another example, an electronic document may be formatted such that sentences are separated by line breaks. A return-type line break is a line break that would occur when a user of an electronic word processing document presses the "Enter" or "Return" key to return the cursor from its current location on a line to the left side of the document on the next line. Examples of return-type line breaks include line breaks at the end of paragraphs and line breaks after each item on a list of items.

If the system determines that the line break is associated with a return-type text formatting, the system stores a tag associated with a line break together with the segment of text (Operation 412). According to one embodiment, the tag is associated with a different document format than that of the electronic document. For example, the electronic document may be a PDF document and the tag may be associated with html formatting. In the example above, in which the electronic document includes the terms " . . . documents are also required." followed by "The documentation matrix . . . ", the system may store the following:

. . . documents are also required. <br><br>The documentation matrix . . .

If the system determines that the line break is not associated with a return-type text formatting, the system refrains from storing a tag associated with a line break together with the segment of text (Operation 414). For example, if the system determines that the line break is in the middle of a sentence, the system does not store a tag associated with a line break in the middle of the sentence.

In the example in which the system converts text data from a PDF document into html, applying line breaks at locations associated with return-type text formatting allows lines in the html document to vary in length relative to the PDF document. For example, the PDF document may be formatted with two columns. The digital file of the PDF document may include metadata representing line breaks at the end of each line in each column. By omitting line breaks mid-sentence, for example, the system may reproduce the text of the PDF document while expanding or contracting the width of the lines of text, such as by increasing and decreasing a window size of a web page browser window.

6. Example Embodiment

Figure 5:
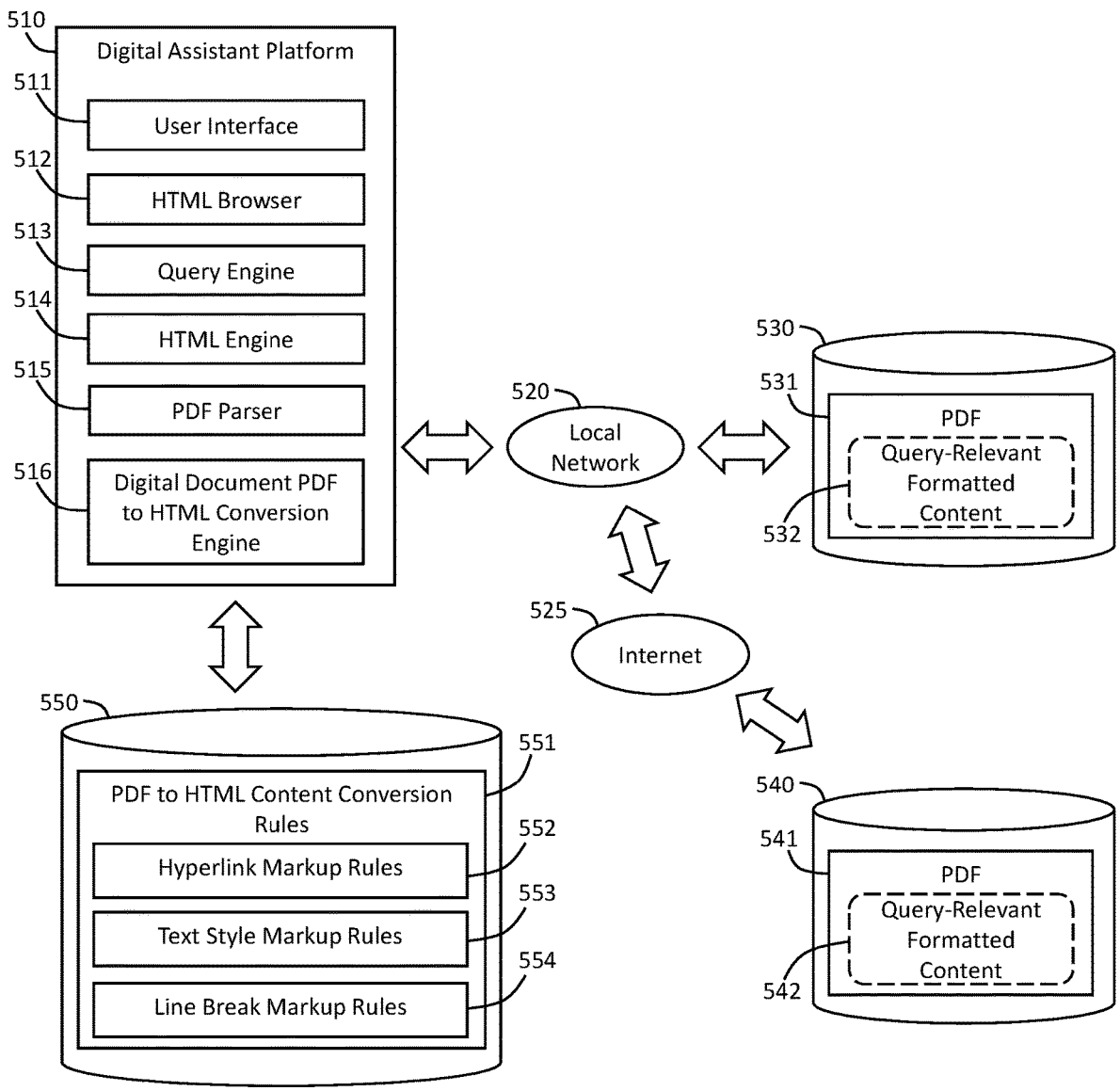
FIG. 5 illustrates an example embodiment.

FIG. 5 illustrates an example embodiment of a system 500 for converting PDF content into HTML content in response to a query. A digital assistant platform 510 includes a user interface 511 and a query engine 513. The user interface 511 includes interface elements to allow a user to generate a query. Interface elements may be implemented as visual elements of a graphical user interface (GUI) of a display device, for example. The user interface 511 further includes a display element to display query results. The user interface 511 displays query results via an HTML browser 512 window generated by an HTML engine 514.

The query engine 513 analyzes query terms received via the user interface 511 to generate a query. The query engine 513 include functionality to identify content matching the query terms in documents of varying formats. For example, while the HTML engine 514 includes functionality only to generate HTML content, the query engine 513 includes functionality to identify content in HTML-type documents, PDF-type documents, and word-processing-type documents.

The query engine 513 identifies a PDF-type document 531 including query-relevant content 532 stored in a database 530 in communication with the digital assistant platform 510 via a local network 520. The query engine 513 queries the database 530 by generating a query in structured query language (SQL). The query engine 513 identifies another PDF-type document 541 including query-relevant content 542 stored in a remote server 540. The remote server 540 is in communication with the digital assistant platform 510 via the Internet 525. The query engine 513 performs a search of remote servers for relevant content on the Internet 525 by utilizing a search engine.

A PDF parser 515 parses the PDF documents 531 and 541. The resulting parsed data file includes: (a) character data for each character, including character location, character font, and character font style, (b) bounding box location data, and (c) hyperlink address data associated with the bounding box. The digital document PDF to HTML conversion engine 516 analyzes the parsed PDF files to identify content to be converted into HTML-type formatting. The PDF to HTML conversion engine 516 identifies bounding boxes and associated hyperlinks. The PDF to HTML conversion engine 516 identifies characters with rich text formatting (RTF) type character style. The PDF to HTML conversion engine 516 identifies line breaks in the parsed PDF files.

The PDF to HTML conversion engine 516 generates markup-type content from the parsed PDF documents. The PDF to HTML conversion engine 516 applies PDF to HTML content conversion rules 551 stored in a data repository 550 to identify the convertible content and to perform the conversion. For example, the PDF to HTML conversion engine 516 applies a set of hyperlink markup rules 552 to determine an overlap of a bounding box associated with a hyperlink and characters in the PDF document. In particular, the PDF to HTML conversion engine 516 compares location information of the bounding box with location information of the characters to determine whether at least a portion of the characters overlaps, or is contained within, the bounding box. Based on the hyperlink markup rules 552, the PDF to HTML conversion engine 516 identifies a set of characters to associate with a hyperlink. The PDF to HTML conversion engine 516 generates HTML tags and stores the HTML tags with the set of characters. The HTML tags cause the HTML engine 514 to associate the set of characters with the hyperlink upon rendering the HTML-type content.

As another example, the PDF to HTML conversion engine 516 applies a set of text style markup rules 553 to identify characters that have an RTF-type formatting. The PDF to HTML conversion engine 516 groups consecutively-occurring characters with the same RTF-type formatting into segments. The PDF to HTML conversion engine 516 generates HTML tags for the respective segments based on the respective RTF-type formatting. The HTML tags cause the HTML engine 514 to render the respective segments in the same RTF-type formatting as in the PDF documents 531 and 541.

According to yet another example, the PDF to HTML conversion engine 516 applies a set of line break markup rules 554 to identify line breaks in the PDF documents. The line break markup rules 554 differentiate between line breaks at the end of paragraphs and list items and lines that continue from one row to another, such as when a sentence carries over across multiple rows. The PDF to HTML conversion engine 516 identifies sets of consecutive characters associated with line breaks in the PDF files 531 and 541. The PDF to HTML conversion engine 516 groups the sets of consecutive characters as respective segments. The PDF to HTML conversion engine 516 generates HTML tags for the respective segments. The HTML tags cause the HTML engine 514 to render the respective segments with line breaks as in the PDF documents 531 and 541.

The HTML engine 514 generates an HTML browser 512 to be displayed in a GUI of the user interface 511. The browser 512 includes the query-relevant content 532 and 542 contained in the PDF documents 531 and 541, respectively. The browser 512 may omit portions of the PDF documents 531 and 541 that do not include query-relevant content. Based on the HTML tags generated by the PDF to HTML conversion engine 516 in association with content 532 and 542, the HTML browser 512 displays the content 532 and 542 with the same formatting elements as in the PDF documents 531 and 541. In particular, the HTML browser 5412 displays the content 532 and 542 with hyperlinked text, with RTF-type text, and with line breaks corresponding to the hyperlinks, RTF text, and line breaks in the PDF documents 531 and 541.

7. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

8. MISCELLANEOUS; EXTENSIONS

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

9. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer readable media comprising instructions which, when executed by one or more hardware processors, causes performance of operations comprising:
    identifying a digital file representing an electronic document, the electronic document comprising:
        a plurality of characters with associated location information indicating a location of each of the plurality of characters within an image of the electronic document,
        a bounding box associated with a hyperlink, the bounding box being a region within the image of the electronic document identified by location coordinates;
    generating, based on the electronic document, tagged content comprising the plurality of characters at least by:
        based on a location of each of the plurality of characters within the image of the electronic document and the location coordinates identifying the bounding box:
            determining that the region, within the image of the electronic document corresponding to the bounding box, includes a particular subset of one or more characters of the plurality of characters;
            grouping the particular subset of characters into a same first segment of a plurality of segments; and
            generating a formatting tag that represents the hyperlink; and
        storing the formatting tag in association with the first segment.

2. The one or more non-transitory computer readable media of claim 1, wherein the operations further comprise:
    rendering the tagged content by applying the formatting tag to the first segment.

3. The one or more non-transitory computer readable media of claim 1, wherein the electronic document represents individual formatting tags for each character in the electronic document.

4. The one or more non-transitory computer readable media of claim 3, wherein the electronic document is an image-type document and the tagged content is stored as a markup-type document.

5. The one or more non-transitory computer readable media of claim 1, wherein the operations further comprise:
    storing the tagged content in a different format than the electronic document.

6. The one or more non-transitory computer readable media of claim 1, wherein the operations further comprise displaying the tagged content as a search result in a web browser,
    wherein displaying the tagged content includes including in the web browser a hyperlink selectable by a user to access remote content at an address associated with the hyperlink.

7. The one or more non-transitory computer readable media of claim 1, wherein the operations further comprise:
    receiving a query specifying a set of query terms; and
    responsive to receiving the query, identifying an image-type electronic document containing content matching the set of query terms,
    wherein identifying the digital file and generating the tagged content are performed responsive to identifying the image-type electronic document, and
    wherein the operations further comprise:
        generating a response to the query including the tagged content, the response including the hyperlink.

8. One or more non-transitory computer readable media comprising instructions which, when executed by one or more hardware processors, causes performance of operations comprising:
    identifying a digital file representing an electronic document including a plurality of characters,
        wherein a first character of the plurality of characters is associated with a first formatting tag indicating first rich text formatting information for the first character, and
        wherein a second character of the plurality of characters is associated with a second formatting tag indicating second rich text formatting information for the second character; and
    generating, based on the digital file, tagged content comprising the plurality of characters at least by:
        parsing the digital file to determine (a) that the first character and the second character are consecutive characters, and (b) first rich text formatting information for the first character is identical to the second rich text formatting information for the second character;
responsive to determining (a) that the first character and the second character are consecutive characters, and (b) first rich text formatting information for the first character is identical to the second rich text formatting information for the second character:
grouping the first character and the second character into a same first segment of a plurality of segments;
generating a third formatting tag that represents rich text formatting corresponding to the first rich text formatting information and the second rich text formatting information; and
storing the third formatting tag in association with the first segment.

9. The one or more non-transitory computer readable media of claim 8, wherein the operations further comprise:
rendering the tagged content by applying the third formatting tag to the first segment.

10. The one or more non-transitory computer readable media of claim 8, wherein the electronic document represents individual formatting tags for each character in the electronic document.

11. The one or more non-transitory computer readable media of claim 10, wherein the electronic document is an image-type document and the tagged content is stored as a markup-type document.

12. The one or more non-transitory computer readable media of claim 11, wherein the electronic document is portable document format (PDF)-type document and the markup-type document is a hypertext markup language (HTML) type document.

13. The one or more non-transitory computer readable media of claim 8, wherein the operations further comprise:
storing the tagged content in a different format than the electronic document.

14. The one or more non-transitory computer readable media of claim 8, wherein the operations further comprise displaying the tagged content as a search result in a web browser.

15. The one or more non-transitory computer readable media of claim 8, wherein the operations further comprise:
receiving a query specifying a set of query terms; and
responsive to receiving the query, identifying an image-type electronic document containing content matching the set of query terms,
wherein identifying the digital file and generating the tagged content are performed responsive to identifying the image-type electronic document, and
wherein the operations further comprise:
generating a response to the query including the tagged content.

16. One or more non-transitory computer readable media comprising instructions which, when executed by one or more hardware processors, causes performance of operations comprising:
identifying a digital file representing an electronic document including a plurality of characters and a plurality line breaks,
generating, based on the digital file, tagged content comprising the plurality of characters at least by:
parsing the digital file to identify a first line break and a second line break of the plurality of line breaks;
determining whether to include the first line break in the tagged content based on
a whether the first line break meets a particular criteria, wherein the
particular criteria comprises one or more of:
a location of the line break being at an end of a sentence;
a location of the line break being at an end of a paragraph;
a location of the line break being at an end of an item in a list of items;
responsive to determining that the first line break meets the particular criteria, including the first line break in the tagged content;
determining whether to include the second line break in the tagged content based on whether the second line break meets the particular criteria; and
responsive to determining that the second line break does not meet the particular criteria, refraining from including the second line break in the tagged content.

17. The one or more non-transitory computer readable media of claim 16, wherein including the first line break in the tagged content comprises generating a formatting tag in the tagged content following a character at an end of a first line of one or more characters.

18. The one or more non-transitory computer readable media of claim 16, wherein the electronic document represents individual formatting tags for each character in the electronic document.

19. The one or more non-transitory computer readable media of claim 18, wherein the electronic document is an image-type document and the tagged content is stored as a markup-type document.

20. The one or more non-transitory computer readable media of claim 16, wherein the operations further comprise:
storing the tagged content in a different format than the electronic document.

21. A method, comprising:
identifying a digital file representing an electronic document, the electronic document comprising:
a plurality of characters with associated location information indicating a location of each of the plurality of characters within an image of the electronic document,
a bounding box associated with a hyperlink, the bounding box being a region within the image of the electronic document identified by location coordinates;
generating, based on the electronic document, tagged content comprising the plurality of characters at least by:
based on a location of each of the plurality of characters within the image of the electronic document and the location coordinates identifying the bounding box:
determining that the region, within the image of the electronic document corresponding to the bounding box, includes a particular subset of one or more characters of the plurality of characters;
grouping the particular subset of characters into a same first segment of a plurality of segments; and
generating a formatting tag that represents the hyperlink; and
storing the formatting tag in association with the first segment.

22. The method of claim 21, further comprising:
rendering the tagged content by applying the formatting tag to the first segment.

23. The method of claim 21, wherein the electronic document represents individual formatting tags for each character in the electronic document.

24. The method of claim 23, wherein the electronic document is an image-type document and the tagged content is stored as a markup-type document.

25. The method of claim 21, further comprising:
storing the tagged content in a different format than the electronic document.

26. The method of claim 21, further comprising:
displaying the tagged content as a search result in a web browser,
wherein displaying the tagged content includes including in the web browser a hyperlink selectable by a user to access remote content at an address associated with the hyperlink.

27. The method of claim 21, further comprising:
receiving a query specifying a set of query terms; and
responsive to receiving the query, identifying an image-type electronic document containing content matching the set of query terms,
wherein identifying the digital file and generating the tagged content are performed responsive to identifying the image-type electronic document, and
wherein the method further comprises:
    generating a response to the query including the tagged content, the response including the hyperlink.

28. A method, comprising:
identifying a digital file representing an electronic document including a plurality of characters,
    wherein a first character of the plurality of characters is associated with a first formatting tag indicating first rich text formatting information for the first character, and
    wherein a second character of the plurality of characters is associated with a second formatting tag indicating second rich text formatting information for the second character; and
generating, based on the digital file, tagged content comprising the plurality of characters at least by:
    parsing the digital file to determine (a) that the first character and the second character are consecutive characters, and (b) first rich text formatting information for the first character is identical to the second rich text formatting information for the second character;
    responsive to determining (a) that the first character and the second character are consecutive characters, and (b) first rich text formatting information for the first character is identical to the second rich text formatting information for the second character:
    grouping the first character and the second character into a same first segment of a plurality of segments;
    generating a third formatting tag that represents rich text formatting corresponding to the first rich text formatting information and the second rich text formatting information; and
    storing the third formatting tag in association with the first segment.

29. The method of claim 28, further comprising:
rendering the tagged content by applying the third formatting tag to the first segment.

30. The method of claim 28, wherein the electronic document represents individual formatting tags for each character in the electronic document.

31. The method of claim 30, wherein the electronic document is an image-type document and the tagged content is stored as a markup-type document.

32. The method of claim 31, wherein the electronic document is portable document format (PDF)-type document and the markup-type document is a hypertext markup language (HTML) type document.

33. The method of claim 28, further comprising:
storing the tagged content in a different format than the electronic document.

34. The method of claim 28, further comprising:
displaying the tagged content as a search result in a web browser.

35. The method of claim 28, further comprising:
receiving a query specifying a set of query terms; and
responsive to receiving the query, identifying an image-type electronic document containing content matching the set of query terms,
wherein identifying the digital file and generating the tagged content are performed responsive to identifying the image-type electronic document, and wherein the method further comprises:
generating a response to the query including the tagged content.

36. A method, comprising:
identifying a digital file representing an electronic document including a plurality of characters and a plurality line breaks, generating, based on the digital file, tagged content comprising the plurality of characters at least by:
    parsing the digital file to identify a first line break and a second line break of the plurality of line breaks;
    determining whether to include the first line break in the tagged content based on a whether the first line break meets a particular criteria, wherein the particular comprises one or more of:
        a location of the line break being at an end of a sentence;
        a location of the line break being at an end of a paragraph;
        a location of the line break being at an end of an item in a list of items;
    responsive to determining that the first line break meets the particular criteria, including the first line break in the tagged content;
    determining whether to include the second line break in the tagged content based on whether the second line break meets the particular criteria; and
    responsive to determining that the second line break does not meet the particular criteria, refraining from including the second line break in the tagged content.

37. The method of claim 36, wherein including the first line break in the tagged content comprises generating a formatting tag in the tagged content following a character at an end of a first line of one or more characters.

38. The method of claim 36, wherein the electronic document represents individual formatting tags for each character in the electronic document.

39. The method of claim 38, wherein the electronic document is an image-type document and the tagged content is stored as a markup-type document.

40. The method of claim 36, further comprising:
storing the tagged content in a different format than the electronic document.

* * * * *